United States Patent
Choi et al.

(10) Patent No.: US 11,561,424 B2
(45) Date of Patent: Jan. 24, 2023

(54) TILED DISPLAY DEVICE

(71) Applicant: Samsung Display Co., Ltd., Yongin-si (KR)

(72) Inventors: Jong Hyeon Choi, Pyeongtaek-si (KR); Haeng Won Park, Seongnam-si (KR); Il Hyun Yang, Cheonan-si (KR); Dae Hwan Jang, Seoul (KR); Jin Ho Cho, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 26 days.

(21) Appl. No.: 17/161,551

(22) Filed: Jan. 28, 2021

(65) Prior Publication Data
US 2021/0325711 A1 Oct. 21, 2021

(30) Foreign Application Priority Data
Apr. 21, 2020 (KR) .................. 10-2020-0047920

(51) Int. Cl.
*G02F 1/1333* (2006.01)
*G02F 1/1335* (2006.01)
*G02F 1/1345* (2006.01)

(52) U.S. Cl.
CPC ...... *G02F 1/13336* (2013.01); *G02F 1/13452* (2013.01); *G02F 1/133334* (2021.01); *G02F 1/133385* (2013.01); *G02F 1/133512* (2013.01); *G02F 2201/503* (2013.01)

(58) Field of Classification Search
None
See application file for complete search history.

(56) References Cited

U.S. PATENT DOCUMENTS

| | | | |
|---|---|---|---|
| 6,256,075 B1* | 7/2001 | Yang | G06F 1/1601 348/836 |
| 2002/0163301 A1* | 11/2002 | Morley | G02F 1/13336 313/506 |
| 2016/0026030 A1* | 1/2016 | Kang | H05K 1/028 361/749 |
| 2019/0129235 A1* | 5/2019 | Yamamoto | G02F 1/133308 |
| 2019/0204669 A1* | 7/2019 | Lee | H01L 23/4985 |
| 2019/0303086 A1* | 10/2019 | Nagayama | H05K 5/0017 |
| 2020/0205305 A1* | 6/2020 | Kim | F16M 11/041 |

FOREIGN PATENT DOCUMENTS

| | | | |
|---|---|---|---|
| JP | 5910160 | | 4/2016 |
| KR | 10-1126430 | | 3/2012 |
| KR | 20180083076 A | * | 1/2017 |
| KR | 10-2023871 | | 9/2019 |

* cited by examiner

Primary Examiner — Shan Liu
(74) *Attorney, Agent, or Firm* — H.C. Park & Associates, PLC

(57) ABSTRACT

Provided is a tiled display device including a plurality of display devices each having a display panel including a plurality of pixels and a support plate disposed under the display panel, a lower cover including an alignment hole and coupled to a lower portion of the support plate of each of the plurality of display devices, and a first coupling member including a base portion fixed to the support plate and a first coupling portion protruding from the base portion and passing through the alignment hole. A diameter of the first coupling portion is smaller than a diameter of the alignment hole.

16 Claims, 12 Drawing Sheets

20: 21, 22, 23, 24

TILED DISPLAY DEVICE

CROSS REFERENCE TO RELATED APPLICATION

This application claims priority from and the benefit of Korean Patent Application No. 10-2020-0047920, filed on Apr. 21, 2020 which is hereby incorporated by reference for all purposes as if fully set forth herein.

BACKGROUND

Field

The present invention relates to a tiled display device.

Discussion of the Background

With the development of information society, requirements for display devices for displaying images have increased in various forms. For example, display devices are applied to various electronic appliances such as smart phones, digital cameras, notebook computers, navigators, and smart televisions. A display device may be a flat panel display device such as a liquid crystal display device, a field emission display device, or a light emitting display device. Because the light emitting display device, among flat panel display devices, includes light emitting elements by which each of the pixels in a display panel emits light by itself, it may display an image without a backlight unit providing light to the display panel.

When a display device is manufactured in a large size, the defective rate of light emitting elements may increase due to an increase in the number of pixels, and productivity or reliability may deteriorate. In order to solve the above problem, a tiled display device may implement a large-sized screen by connecting a plurality of display devices having relatively small sizes. The tiled display device may include a boundary portion called a seam between the plurality of display devices due to the non-display area or bezel area of each of the plurality of display devices adjacent to each other. When a single image is displayed on the entire screen, the boundary portion between the plurality of display devices gives a disconnection feeling on the entire screen, thereby reducing the immersion of the image.

The above information disclosed in this Background section is only for understanding of the background of the inventive concepts, and, therefore, it may contain information that does not constitute prior art.

SUMMARY

Example embodiments provide a tiled display device capable of removing the disconnection feeling between a plurality of display devices and improving the immersion of an image by preventing a boundary portion or non-display area between the plurality of display devices from being visually recognized.

Additional features of the inventive concepts will be set forth in the description which follows, and in part will be apparent from the description, or may be learned by practice of the inventive concepts.

According to embodiments of the inventive concepts, a tiled display device includes a plurality of display devices each including a display panel including a plurality of pixels and a support plate disposed under the display panel, a lower cover including an alignment hole and coupled to a lower portion of the support plate of each of the plurality of display devices, and a first coupling member including a base portion fixed to the support plate and a first coupling portion protruding from the base portion and passing through the alignment hole. A diameter of the first coupling portion is smaller than a diameter of the alignment hole.

The alignment hole surrounds the first coupling portion on a plane to be spaced apart from the first coupling portion.

Tiled display device may further include a second coupling member disposed on a lower surface of the lower cover and coupled to the first coupling portion to fix the plurality of display devices onto the lower cover.

The alignment hole may be surrounded by an outer surface of the first coupling portion, a lower surface of the support plate, an inner surface of the lower cover surrounding the alignment hole, and an upper surface of the second coupling portion.

The second coupling member may include: a base portion disposed under the lower cover, and a second coupling portion protruding from the base portion to be coupled with the first coupling portion and closely contacting the lower surface of the lower cover.

The first coupling portion may be a male screw, and the second coupling portion may be a female screw that is screwed to the first coupling portion.

A height of the first coupling portion may be equal to or less than a sum of a height of the alignment hole and a height of the second coupling portion.

An outer diameter of the second coupling portion may be larger than the diameter of the alignment hole.

Each of the plurality of display devices may further include a panel lower member disposed between the display panel and the support plate.

The panel lower member may include at least one of a heat dissipation layer configured to dissipate heat from the display panel, an electromagnetic wave blocking layer configured to block electromagnetic waves, a light blocking layer configured to block light, and a buffer layer configured to absorb an impact.

Each of the display devices may further include: a connection pad on a side surface of the display panel, and a flexible film disposed on one surface of the connection pad.

Each of the display devices may further include: a source driver disposed on one surface of the flexible film, and a source circuit board electrically connected to the flexible film and disposed under the display panel.

The support plate may be disposed under a center of the display panel, and the source circuit board may be disposed under an outer side of the display panel.

The lower cover may include: a flat portion coupled to the support plate to support the support plate, a first protrusion portion protruding from the flat portion in an opposite direction of the display panel and overlapping the flexible film disposed at an outermost side of the plurality of display devices, a side portion bent from the first protrusion portion to surround outer surfaces of the plurality of display devices, and a second protrusion portion protruding from the flat portion in the same direction as the first protrusion portion and overlapping the flexible film between the plurality of display devices.

The display panel may further include a connection line electrically connected to the plurality of pixels and electrically connected to the flexible film through the connection pad.

According to an embodiment of the inventive concepts, a tiled display device includes a plurality of display devices each including a display panel including a plurality of pixels and a support plate disposed under the display panel, a plurality of lower covers corresponding to each of the plurality of display devices, including alignment holes and coupled to a lower portion of the support plate of each of the plurality of display devices, a first coupling member including a base portion fixed to the support plate and a first coupling portion protruding from the base portion and passing through the alignment hole, and an auxiliary plate disposed on one surface of the plurality of lower covers to couple the plurality of lower covers. A diameter of the first coupling portion is smaller than a diameter of the alignment hole.

The tiled display device may further include a second coupling member disposed on a lower surface of the lower cover and coupled to the first coupling portion to fix each of the plurality of display devices onto each of the plurality of lower covers.

An outer diameter of the second coupling portion may be larger than the diameter of the alignment hole.

Each of the lower covers may include: a flat portion coupled to the support plate to support the support plate, a first protrusion portion protruding from one side the flat portion in an opposite direction of the display panel, and a second protrusion portion protruding from the other side of the flat portion in an opposite direction of the display panel.

Each of the lower covers disposed at outermost sides of the plurality of lower covers may further include a side portion bent from the first protrusion portion to surround outer surfaces of the plurality of display devices.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts. The above and other aspects and features of the present invention will become more apparent by describing in detail embodiments thereof with reference to the attached drawings, in which.

DETAILED DESCRIPTION OF THE EMBODIMENTS

Figure 1:
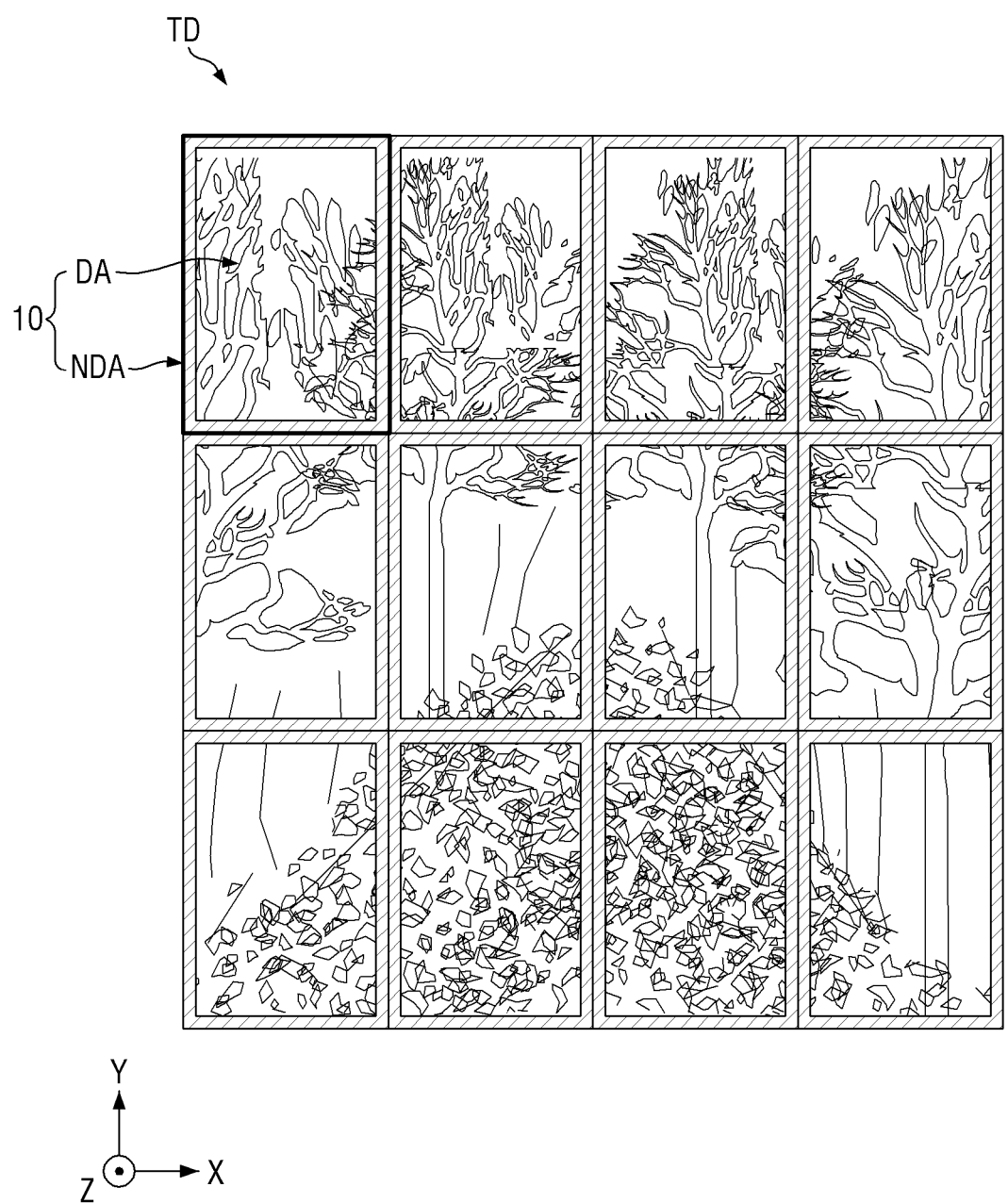
FIG. 1 is a plan view illustrating a tiled display device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the present invention will be described with reference to the attached drawings.

FIG. 1 is a plan view illustrating a tiled display device according to an embodiment.

Referring to FIG. 1, a tiled display device TD may include a plurality of display devices 10. The plurality of display devices 10 may be arranged in a grid shape, but the present invention is not limited thereto. The plurality of display devices 10 may be connected in a first direction (X-axis direction) or a second direction (Y-axis direction), and the tiled display device TD may have a specific shape. For example, each of the plurality of display devices 10 may have the same size as each other, but the present invention is not limited thereto. For another example, the plurality of display devices 10 may have different sizes from each other.

Each of the plurality of display devices 10 may have a rectangular shape including long sides and short sides. The plurality of display devices 10 may be arranged with long sides or short sides connected to each other. Some display devices 10 may be disposed on the edge of the tiled display device TD to form one side of the tiled display device TD. Some other display devices 10 may be disposed at corners of the tiled display device TD to form two adjacent sides of the tiled display device TD. Another display device 10 may be disposed inside the tiled display device TD to be surrounded by other display devices 10.

Each of the plurality of display devices 10 may include a display area DA and a non-display area NDA. The display area DA may include a plurality of pixels to display an image. The non-display area NDA may be disposed around the display area DA to surround the display area DA and may not display an image. Each of the display devices 10 may be configured to display one portion of a composite image or a single image relevant to a single display device 10.

The tiled display device TD may have a planar shape as a whole, but the present invention is not limited thereto. The tiled display device TD may have a three-dimensional shape, thereby providing a three-dimensional effect to a user. For example, when the tiled display device TD has a three-dimensional shape, at least some of the plurality of display devices 10 may have a curved shape. For another example, the plurality of display devices 10 have a planar shape and area connected to each other at a predetermined angle, so that the tiled display device TD may have a three-dimensional shape.

The tiled display device TD may be formed by connecting the non-display areas NDA of adjacent display devices 10. The plurality of display devices 10 may be connected to each other through a connection member or an adhesive member. Accordingly, the non-display area NDA between the plurality of display devices 10 may be surrounded by the adjacent display areas DA. The distance between the display areas DA of the plurality of display devices 10 may be close to such a degree that the non-display area NDA between the plurality of display devices 10 or the boundary portion between the plurality of display devices 10 may not be visually recognized by a user. Further, the external light reflectance of the display area DA of each of the plurality of display devices 10 may be substantially the same as the external light reflectance of the non-display area NDA between the plurality of display devices 10. Accordingly, the tiled display device TD may remove the disconnection feeling between the plurality of display devices and improve the immersion of an image by preventing the boundary portion or the non-display area between the plurality of display devices from being visually recognized.

Figure 2:
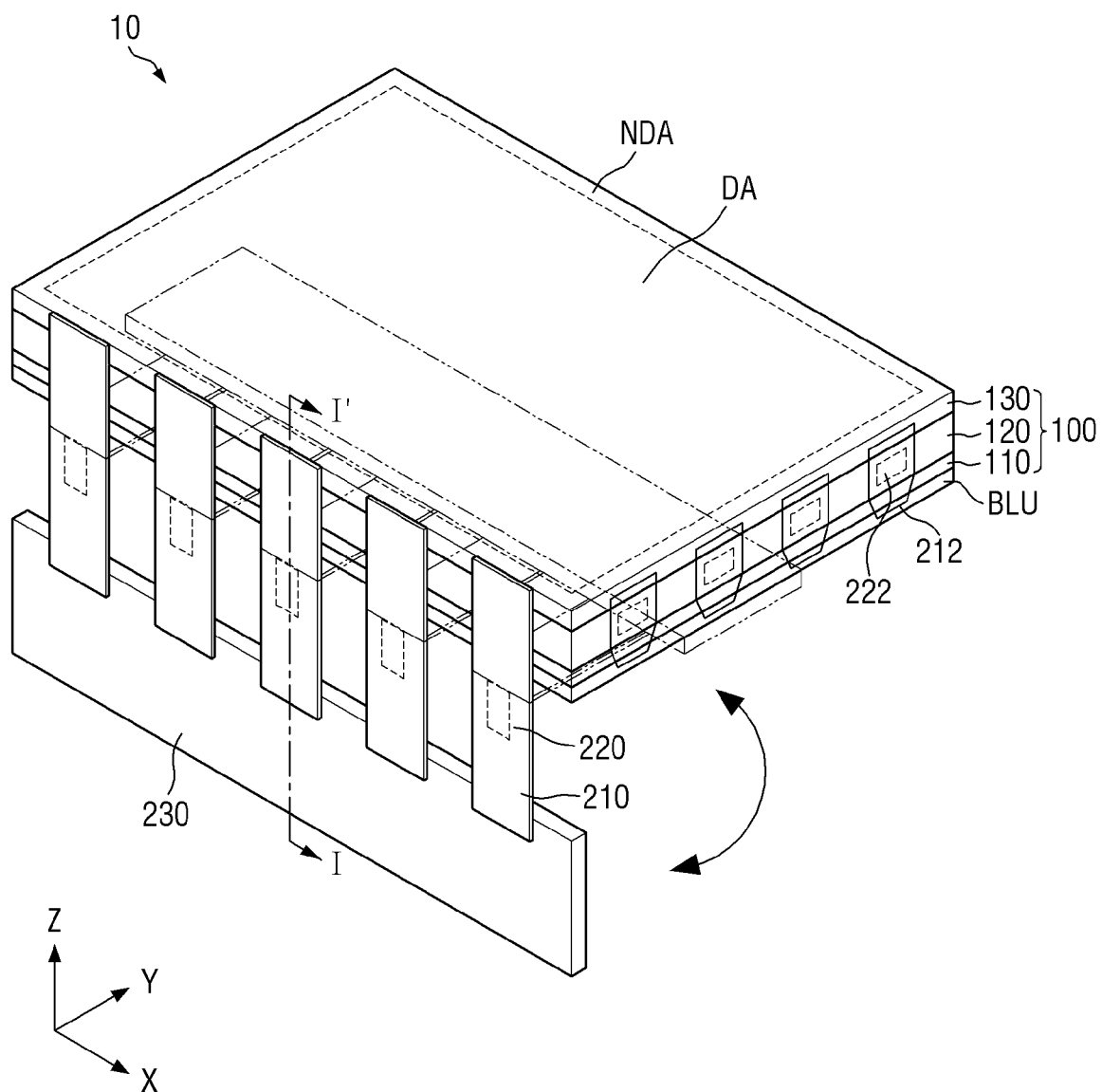
FIG. 2 is a perspective view illustrating a tiled display device according to an embodiment.
Figure 3:
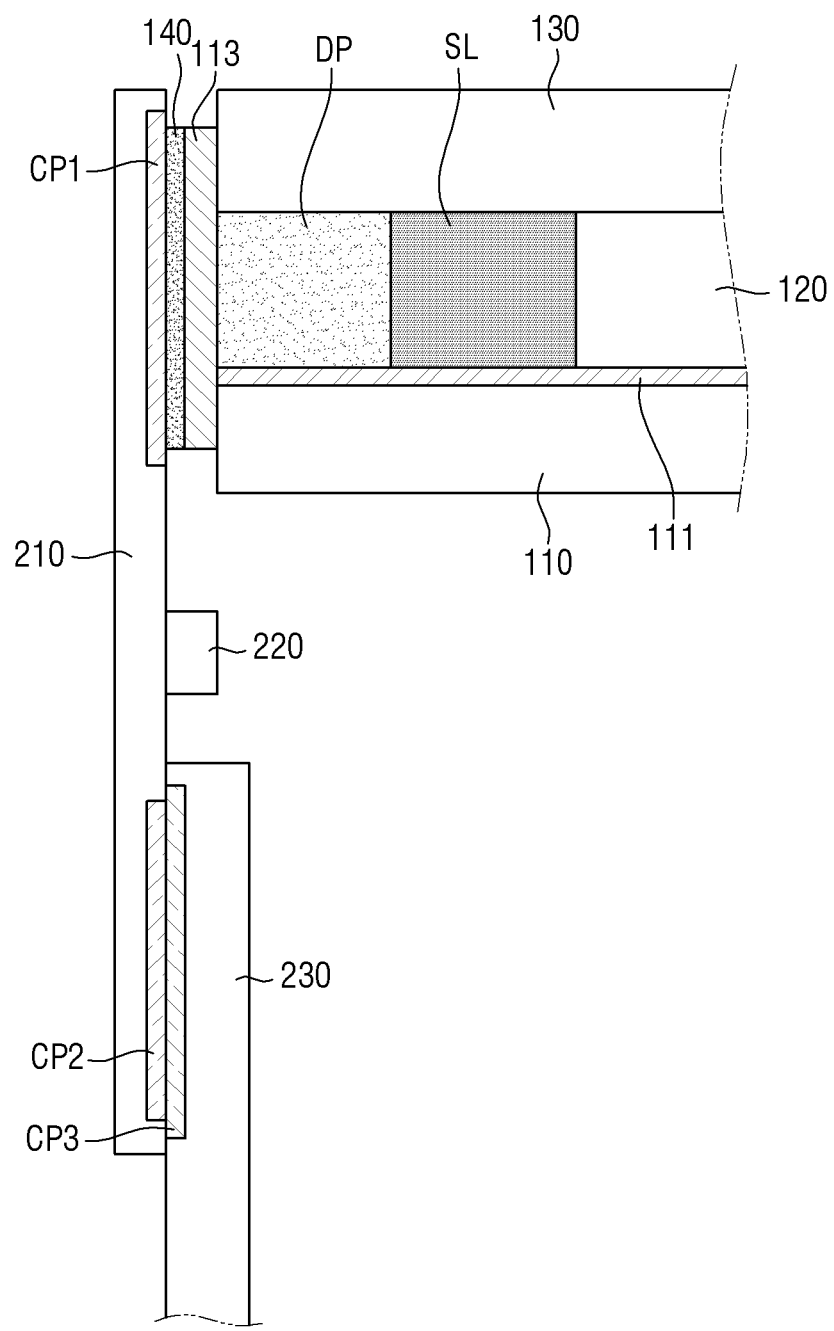
FIG. 3 is a cross-sectional view taken along the line I-I' of FIG. 2

FIG. 2 is a perspective view illustrating a tiled display device according to an embodiment, and FIG. 3 is a cross-sectional view taken along the line I-I' of FIG. 2.

Referring to FIGS. 2 and 3, the display device 10 includes a display panel 100, a plurality of source flexible films 210, a plurality of source drivers 220, a source circuit board 230, a plurality of gate flexible films 212, and a plurality of gate drivers 222.

The display panel 100 may include a backlight unit BLU, a first substrate 110, a liquid crystal layer 120, a second substrate 130, a sealing member SL, and a dummy pattern DP.

For example, each of the backlight unit BLU, the first substrate 110, and the second substrate 130 may have a rectangular shape having long sides in the first direction (X-axis direction) and short sides in the second direction (Y-axis direction) crossing the first direction (X-axis direction). For another example, the backlight unit BLU, the first substrate 110, and the second substrate 130 may have curved portions in some areas.

The backlight unit BLU may supply light to the first substrate 110, the liquid crystal layer 120, and the second substrate 130. The display device 10 may display an image using the light supplied from the backlight unit BLU. For example, the backlight unit BLU may be an edge type backlight unit or a direct type backlight unit, but is not limited thereto.

The first substrate 110 may include a display area DA and a non-display area NDA.

The display area DA, which is an area configured to display an image, may be defined as a central area of the first substrate 110. The display area DA may include a plurality of pixels formed for each pixel area crossed by a plurality of data lines and a plurality of gate lines. Each of the plurality of pixels may be connected to at least one gate line and at least one data line. Each of the plurality of pixels may be defined as an area of a minimum unit that outputs light.

The non-display area NDA may be defined as an area other than the display area DA in the first substrate 110. For example, the non-display area NDA may include a sealing member SL attaching the first and second substrates 110 and 130, a connection pad 113 disposed on the side surface of the display panel 100, a dummy pad DP disposed between the connection pad 113 and the sealing member SL, and a source flexible film 210 electrically connected to the connection pad 113.

The first substrate 110 may further include a connection line 111. The connection line 111 may be disposed on the first substrate 110 at the outer portion of the display panel. The connection line 111 may be electrically connected to the connection pad 113 disposed on the side surface of the display panel 100 and may be connected to the plurality of data lines or the plurality of gate lines. The connection line 111 may be connected to a plurality of pixels through the plurality of data lines or the plurality of gate lines. The connection line 111 may supply a data voltage to the plurality of data lines and supply a gate signal to the plurality of gate lines. For example, the connection line 111 may be formed of the same material on the same layer as a gate electrode of a thin film transistor of the first substrate 110, but the present invention is not limited thereto. For another example, the connection line 111 may be formed of the same material on the same layer as a source electrode or drain electrode of the thin film transistor.

The liquid crystal layer 120 may be disposed between the first substrate 110 and the second substrate 130. For example, the liquid crystal layer 120 may be disposed between a pixel electrode of the first substrate 110 and a common electrode of the second substrate 130. The arrangement of crystal molecules in the liquid crystal layer 130 is changed depending on a difference in voltage between the pixel electrode of the first substrate 110 and the common electrode of the second substrate 130, thereby changing the transmittance of light passing through the liquid crystal layer 120.

The second substrate 130 may be attached to the first substrate 110 with the liquid crystal layer 120 interposed therebetween. The common electrode of the second substrate 130 may face the pixel electrode of the first substrate 110. For example, the first and second substrates 110 and 130 may be attached by the sealing member SL provided along the edge of the display area DA. The sealing member SL may seal the liquid crystal layer 120, thereby preventing the crystal molecules in the liquid crystal layer 120 from being leaked to the outside of the display area DA.

The sealing member SL may be interposed between the edge of the first substrate 110 and the edge of the second substrate 130 in the non-display area NDA. The sealing member SL may be disposed along the edges of the first substrate 110 and the second substrate 130 in the non-display area NDA to seal the liquid crystal layer 120. The first substrate 110 and the second substrate 130 may be coupled to each other through the sealing member SL. For example, the sealing member SL may include an organic material. The sealing member SL may be made of an epoxy resin, but the material thereof is not limited thereto. The connection line may be disposed between the sealing member SL and the first substrate 110.

The dummy pattern DP may be interposed between the edge of the first substrate 110 and the edge of the second substrate 130. For example, the dummy pattern DP may be disposed between the structure on the second substrate 130 and the connection line 111. The dummy pattern DP may be electrically floated, but the present invention is not limited thereto.

The display panel 100 may further include the connection pad 113 disposed on side surfaces of the first and second substrates 110 and 130 and the dummy pattern DP. The connection pad 113 may extend from the side surface of the first substrate 110 to the side surface of the second substrate 130. The connection pad 113 may receive various voltages or signals from the plurality of source flexible films 210 and may supply the corresponding voltages or signals to the connection line 111.

An adhesive film 140 may attach the plurality of source flexible films 210 to one surface of the connection pad 113. One surface of the adhesive film 140 may be attached to one surface of the connection pad 113, and the other surface of the adhesive film 140 may be attached to a first contact pad CP1 of the plurality of source flexible films 210. For example, the adhesive film 140 may cover the entire connection pad 113, but the present invention is not limited thereto. For another example, the adhesive film 140 may cover a part of the connection pad 113 and expose the remaining part thereof to an outside environment.

The adhesive film 140 may include an anisotropic conductive film (ACF). When the adhesive film 140 includes an anisotropic conductive film, the adhesive film 140 may have conductivity in an area where the connection pad 113 contacts the first contact pad CP1 of the plurality of source flexible films 210, and may electrically connect the plurality of source flexible films 210 to the connection pad 113.

For example, the display device 10 may further include a cover window (not illustrated) disposed on the second substrate 130 to protect the display panel 100 and transmit an image to the outside.

The plurality of source flexible films 210 may be disposed on the side surface of the display panel 100. The source flexible film 210 may extend from the side surface of the display panel 100 to the lower surface of the display panel 100. For example, the source flexible film 210 may be disposed on the side surfaces of the first and second substrates 110 and 130 through side bonding. The first contact pad CP1 of the source flexible film 210 may be electrically connected to the connection line 111 of the first substrate 110 on the side surface of the first substrate 110, and the second contact pad CP2 of the source flexible film 210 may be electrically connected to the third contact pad CP3 of the source circuit board 230 on the lower surface of the first substrate 110 through the connection line 111. For example, the source flexible film 210 may be an anisotropic conductive film (ACF) and may transmit a signal from the source driver 220 or the source circuit board 230 to the first substrate 110 through the connection line 111.

Each of the plurality of source drivers 220 may be disposed on one surface of each of the plurality of source flexible films 210. For example, the source driver 220 may be an integrated circuit (IC). The source driver 220 may convert digital video data into an analog data voltage based on a source control signal of a timing controller and may supply the analog data voltage to the data line of the first substrate 110 through the source flexible film 210 through the first contact pad CP1, adhesive film 140, connection pad 113, and connection line 111.

The source circuit board 230 may be connected to the plurality of source drivers 220 or the first substrate 110 through the plurality of source flexible films 210 through the connections illustrated and described herein. The source circuit board 230 may be connected to a control circuit board or a timing controller through a plurality of cables. For example, the source circuit board 230 may be a flexible printed circuit board or a printed circuit board.

The plurality of gate flexible films 212 may be disposed on the other side surface such as a perpendicular side surface of the display panel 100 adjacent to one side of the display panel 100 on which the plurality of source flexible films 210 are disposed. For example, the gate flexible film 212 may be attached to the other side of the display panel 100 by a tape carrier package (TCP) method.

Each of the plurality of gate drivers 222 may be disposed on the gate flexible film 212. The gate driver 222 may receive a gate control signal from a timing controller. The gate driver 222 may generate gate signals based on a gate control signal. The gate driver 222 may sequentially supply the gate signals to the pixels through the plurality of gate lines.

Figure 4:
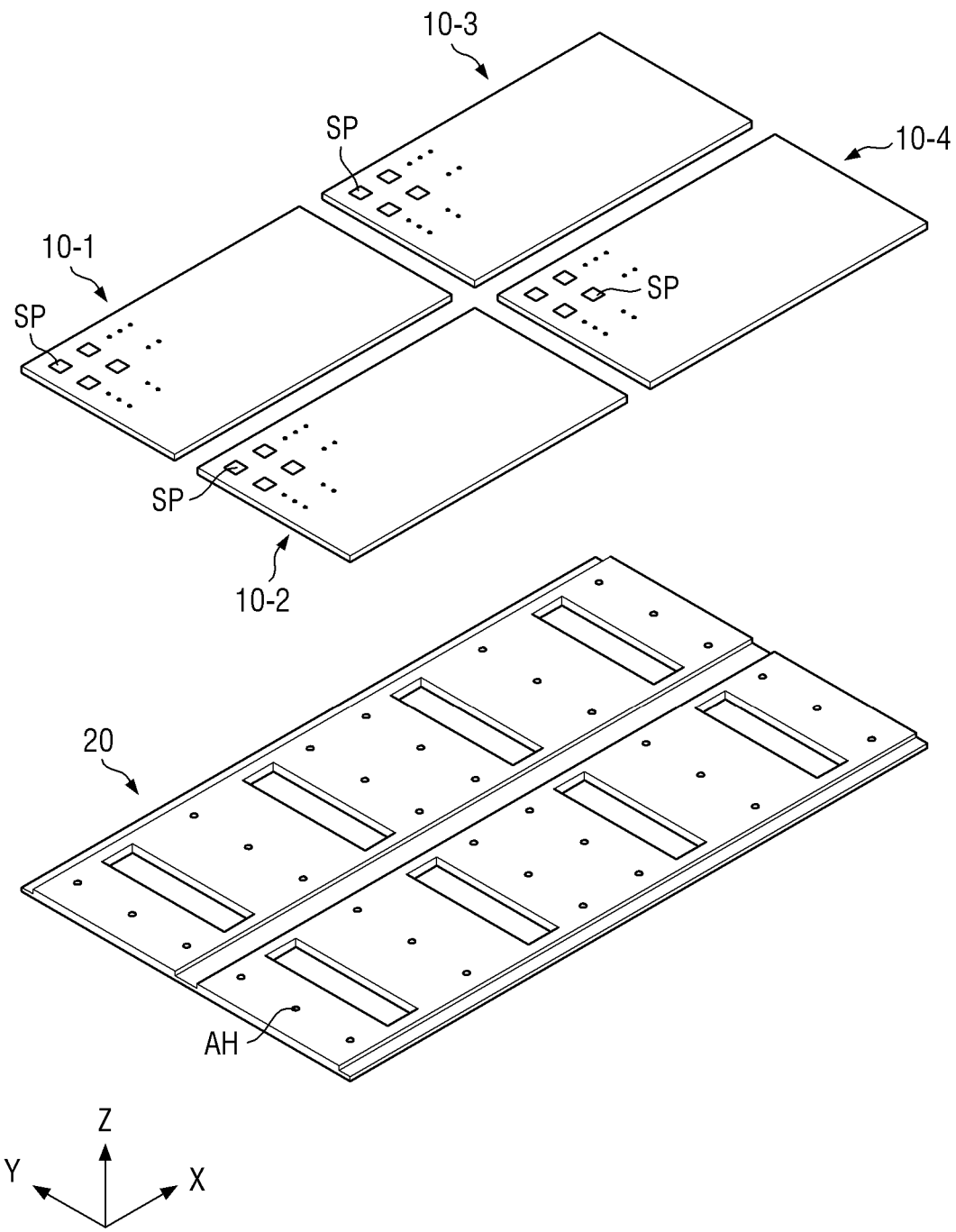
FIG. 4 is an exploded perspective view illustrating a plurality of display devices and a lower cover of a tiled display device according to an embodiment.
Figure 5:
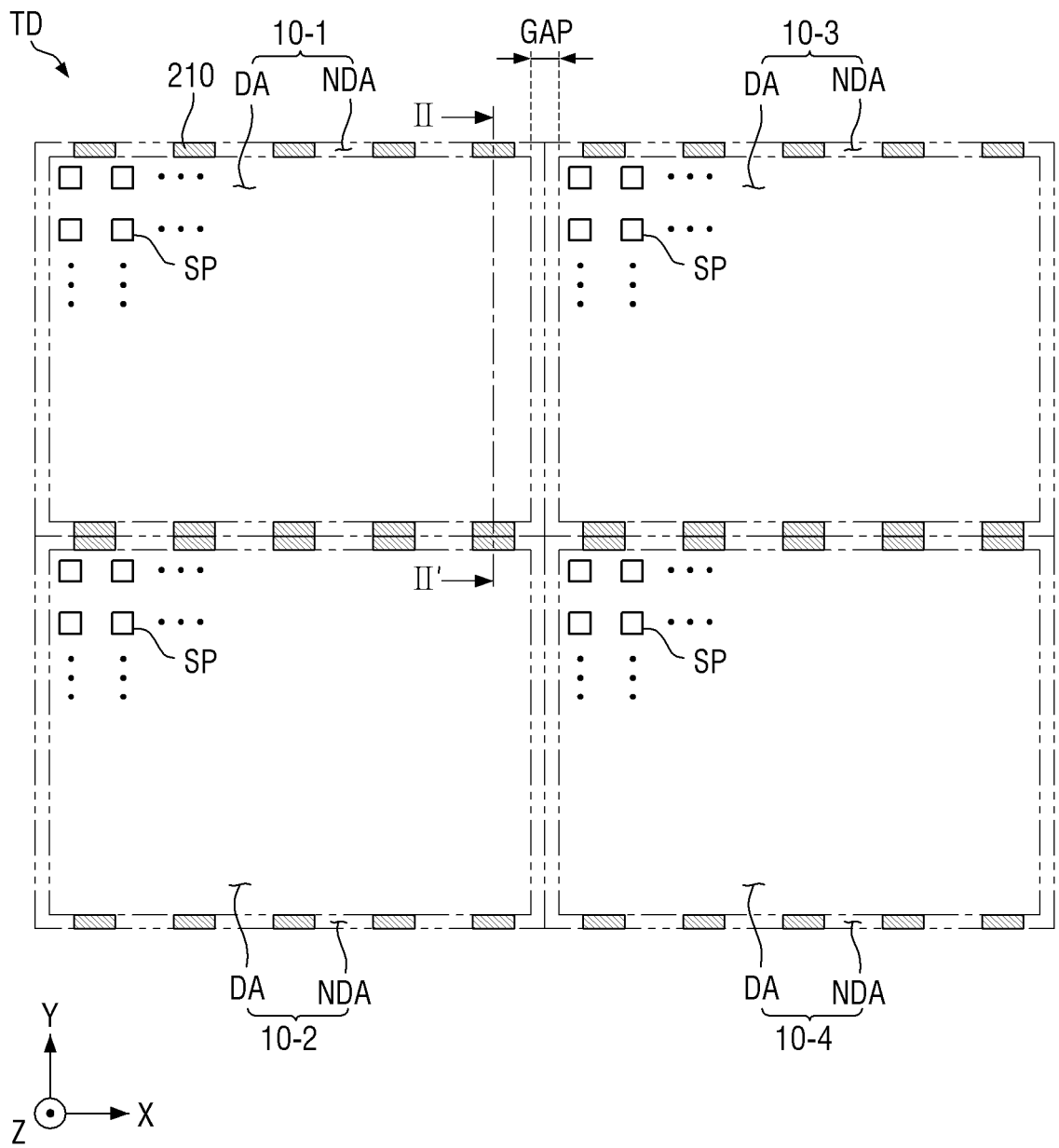
FIG. 5 is a plan view illustrating a structure of a tiled display device according to an embodiment.

FIG. 4 is an exploded perspective view illustrating a plurality of display devices and a lower cover of a tiled display device according to an embodiment, and FIG. 5 is a plan view illustrating a structure of a tiled display device according to an embodiment.

Referring to FIGS. 4 and 5, the tiled display device TD may include first to fourth display devices 10-1, 10-2, 10-3, and 10-4, but the number of display devices 10 is not limited to that of the embodiment of FIGS. 4 and 5. The number of display devices 10 may be determined according to the size of each of the display device 10 and the tiled display device TD.

The first to fourth display devices 10-1, 10-2, 10-3, and 10-4 may be arranged in a lattice shape, and side surfaces thereof contact each other to constitute one tiled display device TD. The first to fourth display devices 10-1, 10-2, 10-3, and 10-4 may be arranged adjacent to each other to display one or a plurality of integrated images. The display area DA of each of the first to fourth display devices 10-1, 10-2, 10-3, and 10-4 is a part of the tiled display device TD and may display an image of the corresponding area in one image displayed from the tiled display device TD. The tiled display device TD may include a plurality of display devices 10 to increase the size of the tiled display device TD while displaying one or a plurality of high-quality images.

Each of the first to fourth display devices 10-1, 10-2, 10-3, and 10-4 may include a plurality of pixels SP arranged along a plurality of rows and a plurality of columns in the display area DA. Each of the plurality of pixels SP may emit light having a predetermined peak wavelength through a light emitting area.

Each of the first and second display devices 10-1 and 10-2 may include a source flexible film 210 between the first and second display devices 10-1 and 10-2. For example, each of the first and second display devices 10-1 and 10-2 may include a connection pad 113 and an adhesive film 140 between the first and second display devices 10-1 and 10-2. The thicknesses of the source flexible film 210, the adhesive film 140, and the connection pad 113 between the first and second display devices 10-1 and 10-2 may determine the gap GAP between the display areas DA of the first and second display devices 10-1 and 10-2. The gap GAP between the display areas DA of the first and second display devices 10-1 and 10-2 may close to such a degree that the non-display area NDA between the first and second display devices 10-1 and 10-2 or the boundary portion between the first and second display devices 10-1 and 10-2 is not recognized by the user.

The distance between the outermost pixels SP of each of the adjacent display devices 10 may be substantially the same as the pitch of the adjacent pixels SP in one display device 10. Here, the pitch may be defined as the distance between the centers of the adjacent pixels SP. For example, the distance between the pixel SP disposed at the lower outermost side of the first display device 10-1 and the pixel SP disposed at the upper outermost side of the second display device 10-2 may be substantially the same as the pitch of the adjacent pixels SP in the first display device 10-1. Therefore, in the tiled display device TD, it is possible to prevent the boundary portion or the non-display area NDA between the plurality of display devices 10 from being recognized and to remove the disconnection feeling between the plurality of display devices 10.

Among the plurality of pixels SP, the distance between the center of the pixel SP disposed on the outermost side of the display device 10 and the outer side of the source flexible film 210 may be less than half the pitch of adjacent pixels SP. For example, the distance between the pixel SP disposed at the lower outermost side of the first display device 10-1 and the source flexible film 210 disposed at the lower side of the first display device 10-1 may be less than half the distance between the pixel SP disposed at the lower outermost side of the first display device 10-1 and the pixel SP disposed at the upper outermost side of the second display device 10-2. Therefore, because the distance between an outermost pixel and the source flexible film 210 is half the distance between pixels, then pixels in adjoining display devices 10 may appear to be adjacent pixels. Therefore, in the tiled display device TD, it is possible to prevent the boundary portion or the non-display area NDA between the plurality of display devices 10 from being recognized and to remove the disconnection feeling between the plurality of display devices 10.

The lower cover 20 may include a plurality of alignment holes AH and may be coupled to the lower portion of the display panel 100 of each of the plurality of display devices 10. The lower cover 20 may be disposed under the tiled display device TD to cover the lower surface of the tiled display device TD and protect the lower surfaces of the plurality of display devices 10. The lower cover 20 may be coupled to the plurality of display devices 10 by coupling members penetrating the plurality of alignment holes AH and may fix and support the plurality of display devices 10. For example, the lower cover 20 may be a plate-like member covering the entire rear surface of the tiled display device TD. The corners of the lower cover 20 may be formed at right angles or may be formed to be rounded to have a predetermined curvature.

The lower cover 20 may include a metal material or a plastic material. For example, the lower cover 20 may include at least one of stainless steel, aluminum (Al), a magnesium (Mg) alloy, a magnesium (Mg)-lithium (Li) alloy, an aluminum (Al) alloy, and polycarbonate (PC), but the material thereof is not limited thereto.

Figure 6:
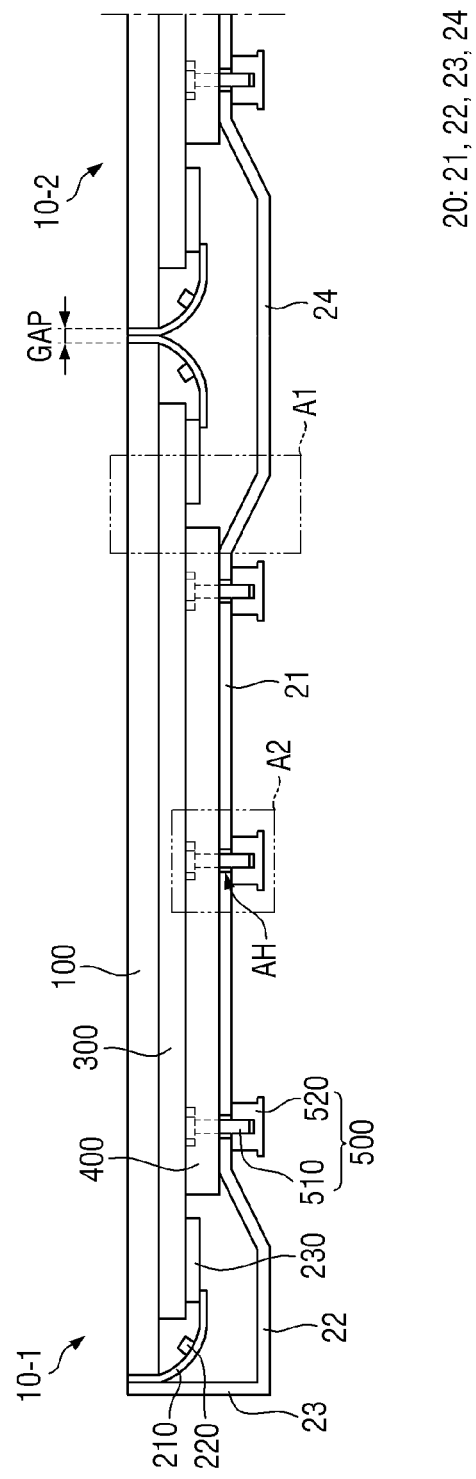
FIG. 6 is a cross-sectional view taken along the line of FIG. 5.
Figure 7:
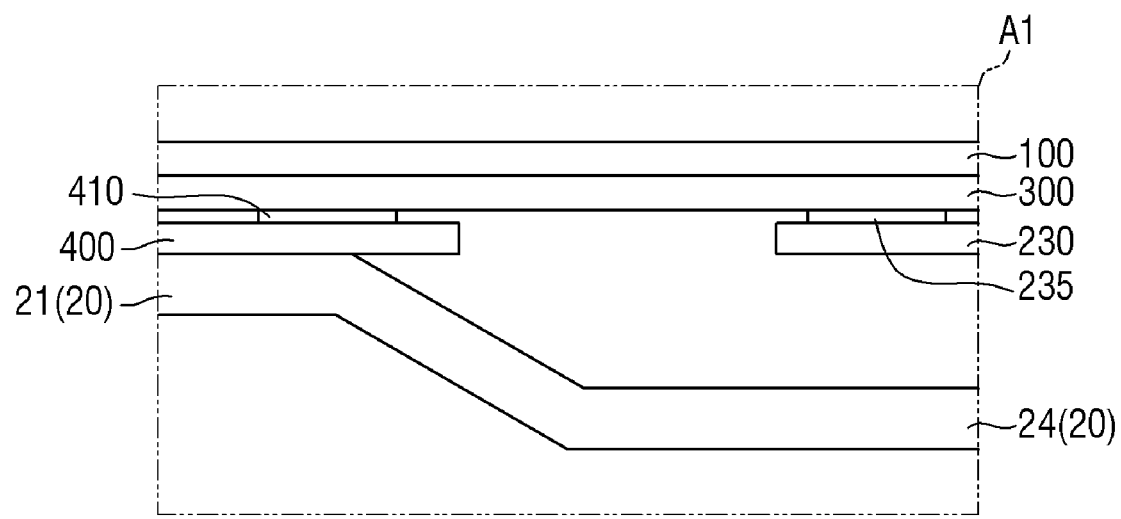
FIG. 7 is an enlarged view of area A1 of FIG. 6.
Figure 8:
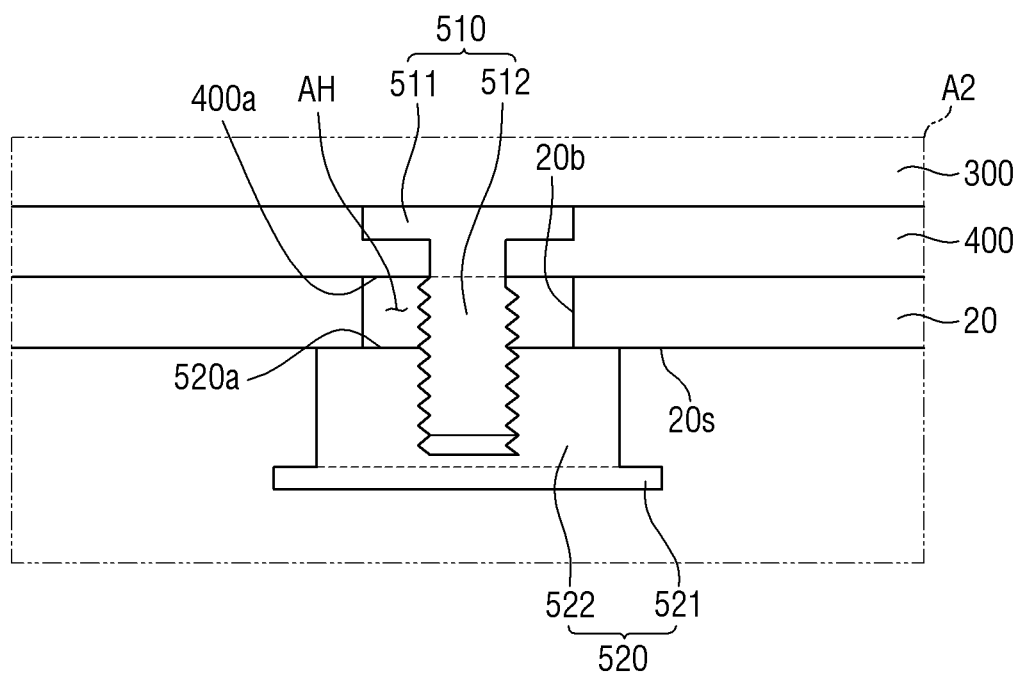
FIG. 8 is an enlarged view of area A2 of FIG. 6.
Figure 9:
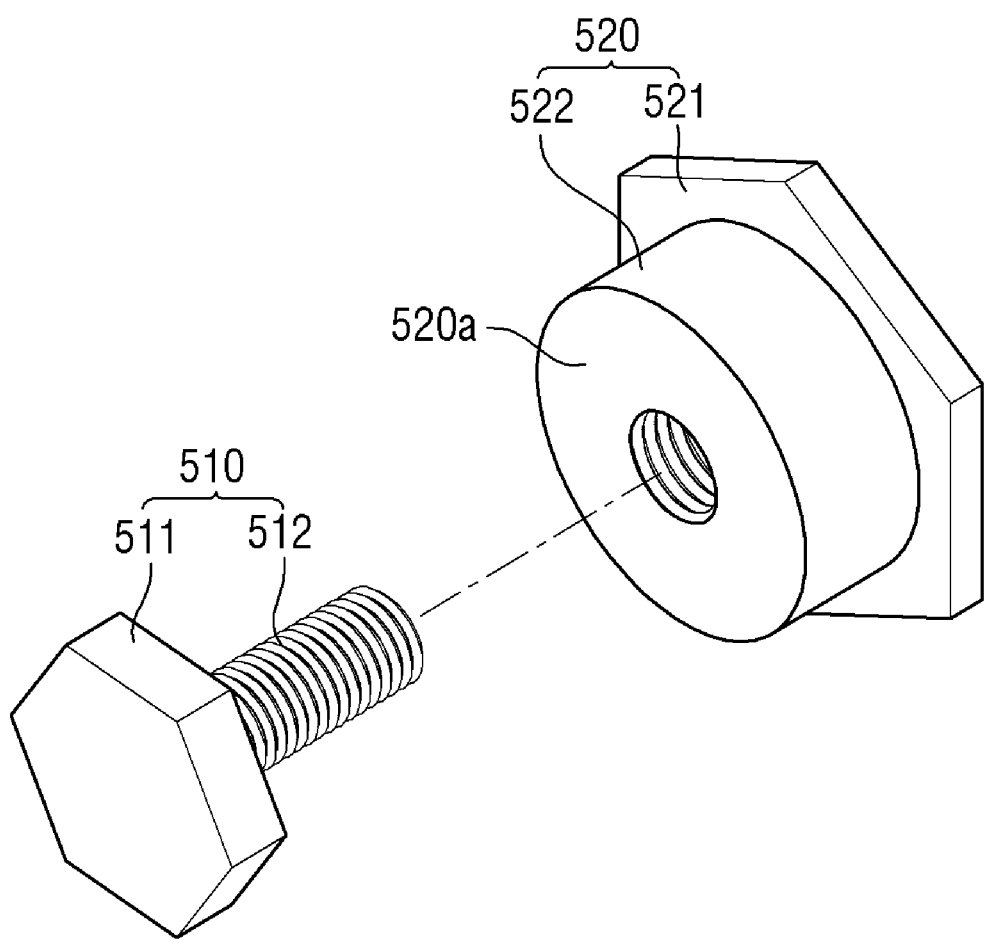
FIG. 9 is a perspective view illustrating first and second coupling members of a tiled display device according to an embodiment.

FIG. 6 is a cross-sectional view taken along the line II-II' of FIG. 5, FIG. 7 is an enlarged view of area A1 of FIG. 6, FIG. 8 is an enlarged view of area A2 of FIG. 6, and FIG. 9 is a perspective view illustrating first and second coupling members of a tiled display device according to an embodiment.

Referring to FIGS. 6 to 9, the tiled display device TD may include a plurality of display devices 10, a lower cover 20, and a coupling member 500 coupling the plurality of display devices 10 and the lower cover 20.

Each of the plurality of display devices 10 may include a display panel 100, a panel lower member 300, a support plate 400, a plurality of source flexible films 210, a plurality of source drivers 220, and a source circuit board 230.

The display panel 100 may include a plurality of pixels SP configured to display one or a plurality of images. For example, the display panel 100 may be a liquid crystal display panel including a first substrate 110, a liquid crystal layer 120, and a second substrate 130, but is not limited thereto. For another example, the display panel 100 may be a light emitting display panel including at least one of an organic light emitting diode, an quantum dot light emitting diode, an inorganic material-based micro light emitting diode (for example, a micro LED), and an inorganic material-based nano light emitting diode (for example, a nano LED). The display panel 100 of each of the plurality of display devices 10 may be a part of the tiled display device TD, and may display an image or images of the corresponding area in one image or a plurality of images displayed from the tiled display device TD. The tiled display device TD may include the plurality of display devices 10 to increase the size of the tiled display device TD while displaying a high-quality image or images.

The panel lower member 300 may be disposed on the lower surface of the display panel 100. The panel lower member 300 may include at least one of a heat dissipation layer configured to efficiently dissipate heat from the display panel 100, an electromagnetic wave blocking layer configured to block electromagnetic waves, a light blocking layer configured to block light incident from the outside, and a buffer layer configured to absorb an external impact. For example, the panel lower member 300 may include graphite to have flexibility and perform a heat dissipation function of the display panel 100.

The support plate 400 may be disposed on the lower surface of the panel lower member 300. The support plate 400 may support the display panel 100 coupled with the panel lower member 300. The support plate 400 may have stronger rigidity than the display panel 100 and the panel lower member 300. The support plate 400 may be disposed under the center of the display panel 100 and may overlap most areas of the display panel 100. The support plate 400 may be coupled to a flat portion 21 of the lower cover 20 through the coupling member 500. For example, the support plate 400 may include at least one of stainless steel, aluminum (Al), a magnesium (Mg) alloy, a magnesium (Mg)-lithium (Li) alloy, an aluminum (Al) alloy, and polycarbonate (PC), but the material thereof is not limited thereto.

The support plate 400 may be attached to the lower surface of the panel lower member 300 through a first adhesive member 410. The first adhesive member 410 may be a double-sided tape or adhesive film having excellent adhesion. For example, the first adhesive member 410 may include at least one of optical clear adhesive (OCA), optical clear resin (OCR), and pressure sensitive adhesive (PSA), but is not limited thereto.

The support plate 400 may fix a first coupling member 510. The first coupling member 510 may be fixed by inserting a first base portion 511 of the first coupling member 510 into the support plate 400. For example, one surface of the first base portion 511 of the first coupling member 510 may be provided to be flat with the upper surface of the support plate 400. For another example, one surface of the first base portion 511 of the first coupling member 510 may be inserted up to the inside of the support plate 400 and in contact with the panel lower member 300. The first base portion 511 of the first coupling member 510 may penetrate the support plate 400, and a first coupling portion 512 of the first coupling member 510 may protrude from the lower surface of the support plate 400.

The plurality of source flexible films 210 may be disposed on the side surface of the display panel 100. The source flexible film 210 may extend from the side surface of the display panel 100 to the lower surface of the display panel 100. For example, the source flexible film 210 may be disposed on the side surfaces of the first and second substrates 110 and 130 through side bonding. The source flexible film 210 disposed at the outermost side of the tiled display device TD may face the side portion 23 of the lower cover 20, and the source flexible film 210 not disposed at the outermost side of the tiled display device TD may face the source flexible film 210 of another adjacent display device 10.

Each of the plurality of source drivers 220 may be disposed on one surface of each of the plurality of source flexible films 210. As noted herein, the source driver 220 may be an integrated circuit (IC). The source driver 220 may convert digital video data into analog data voltages based on the source control signal of a timing controller and may supply the analog data voltages to the data lines of the first substrate 110 through the source flexible film 210.

The source circuit board 230 may be disposed on the lower surface of the panel lower member 300. The source circuit board 230 may be disposed under the outer portion of the display panel 100. The source circuit board 230 may be disposed in an area where the support plate 400 is not disposed on the lower surface of the panel lower member 300, and the source circuit board may then be mounted on the panel lower member 300. The source circuit board 230 may be connected to the plurality of source drivers 220 or the first substrate 110 through the plurality of source flexible films 210. The source circuit board 230 may be connected to a control circuit board or a timing controller through a plurality of cables. For example, the source circuit board 230 may be a flexible printed circuit board or a printed circuit board.

The source circuit board 230 may be attached to the lower surface of the panel lower member 300 through a second adhesive member 235. The second adhesive member 235 may be a double-sided tape or adhesive film having excellent adhesion. For example, the second adhesive member 235 may include at least one of optical clear adhesive (OCA), optical clear resin (OCR), and pressure sensitive adhesive (PSA), but is not limited thereto.

The lower cover 20 may cover the lower surface and side surfaces of the tiled display device TD. The lower cover 20 may include a plurality of alignment holes AH and may be coupled to the lower portion of the display panel 100 of each of the plurality of display devices 10. The lower cover 20 may be disposed under the display panel 100 and the support plate 400 to cover the lower surface of the tiled display device TD. The lower cover 20 may surround the outermost portion of the tiled display device TD and may protect the outer surface of the tiled display device TD.

The lower cover 20 may be coupled to the plurality of display devices 10 by the first coupling members 510 penetrating the plurality of alignment holes AH and the second coupling members 520 corresponding to the first coupling members 510, and may fix and support the plurality of display devices 10. For example, the lower cover 20 may be a plate-like member covering the entire rear surface of the tiled display device TD. The corners of the lower cover 20 may be formed at right angles or may be formed to be rounded to have a predetermined curvature.

The lower cover 20 may include a flat portion 21, a first protrusion portion 22, a side portion 23, and a second protrusion portion 24.

The flat portion 21 of the lower cover 20 may be disposed on the lower surface of the support plate 400 to be coupled with the support plate 400 by the coupling member 500. The flat portion 21 of the lower cover 20 may be coupled with the support plate 400 of each of the plurality of display devices 10 to fix and support the plurality of display devices 10. The flat portion 21 of the lower cover 20 may include a plurality of alignment holes AH.

The alignment hole AH of the flat portion 21 may be interposed between the support plate 400 and the second coupling member 520. The first coupling portion 512 of the first coupling member 510 inserted into the support plate 400 may pass through the alignment hole AH to protrude up to the lower portion of the flat portion 21, and the second coupling portion 522 of the second coupling member 520 may be coupled with the first coupling portion 512 that protrudes. For example, the first coupling portion 512 may be a male screw, and the second coupling portion 522 may be a female screw that is screwed to the first coupling portion 512, but the present invention is not limited thereto.

The diameter of the alignment hole AH may be larger than the diameter of the first coupling portion 512. The alignment hole AH may surround the first coupling portion 512 on the plane to be spaced apart from the first coupling portion 512. For example, the support plate 400 into which the first coupling member 510 is inserted may be mounted on the lower cover 20, and the first coupling portion 512 may pass through the alignment hole AH of the flat portion 21. After the plurality of display devices 10 are mounted on the lower cover 20, the plurality of display devices 10 may be aligned such that the side surfaces thereof are in close contact with each other. Because the diameter of the alignment hole AH is larger than the diameter of the first coupling portion 512, in the process of finely adjusting the positions of the plurality of display devices 10, the first coupling portion 512 may be finely moved within the alignment hole AH. The difference in diameter between the alignment hole AH and the first coupling portion 512 may be designed such that the first coupling portion 512 may freely move within the alignment hole AH in the process of aligning the plurality of display devices 10.

When the alignment of the plurality of display devices 10 is completed, the second coupling portion 522 of the second coupling member 520 may be coupled with the first coupling portion 512, and the plurality of display devices 10 may be fixed and coupled onto the lower cover 20. When the first and second coupling members 510 and 520 are coupled with each other, a gap may occur between the alignment hole AH and the first coupling portion 512, and the alignment hole AH may be bordered by the outer surface of the first coupling portion 512, the lower surface of the support plate 400, the inner surface 20b of the lower cover 20 surrounding the alignment hole AH, and the upper surface of the second coupling portion 522.

Accordingly, because the tiled display device TD includes an alignment hole AH larger than the diameter of the first coupling portion 512, the plurality of display devices 10 may be easily aligned without separate alignment equipment, and the assembly tolerances or coupling tolerances between the plurality of display devices 10 may be prevented. For example, because the tiled display device TD includes the first and second coupling members 510 and 520 and the alignment holes AH, the distance between the plurality of display devices 10-1, 10-2, etc. may be minimized by completely attaching the side surfaces of the plurality of display devices 10 to each other, and the tilt tolerances of the display panels 100 may be minimized. In the tiled display device TD, The scribing tolerances of the display panels 100 may be minimized, and the assembly tolerances occurring in the process of coupling the plurality of display devices 10 to the lower cover 20 may be minimized. As a result, the tiled display device TD may remove the disconnection feeling between the plurality of display devices 10 and improve the immersion of an image by preventing the boundary portion or the non-display area between the plurality of display devices from being visually recognized.

The first protrusion portion 22 of the lower cover 20 may protrude from the flat portion 21 in the opposite direction of the display panel 100. The first protrusion portion 22 may protrude in a direction opposite to the third direction (Z-axis direction). The first protrusion portion 22 may extend from one side of the flat portion 21 to the outer side of the display device 10. The first protrusion portion 22 may overlap the flexible film 210 disposed on the outermost side of the plurality of display devices 10. For example, the first protrusion portion 22 may be spaced from the lower surface of the panel lower member 300 and may accommodate a device or other members connected to the source circuit board 230.

The side portion 23 of the lower cover 20 may be bent from the first protrusion portion 22 to surround the outer surfaces of the plurality of display devices 10. The side portion 23 may form a side appearance of the tiled display device TD. When the tiled display device TD further includes a cover window, the side portion 23 may contact the edge of the cover window. The side portion 23 may overlap the flexible film 210 disposed on the outermost side of the plurality of display devices 10. For example, the side portion 23 may be attached to the side surface of the flexible film 210 or the edge of the cover window through an adhesive member. The side portion 23 may cover the entire side surface of the tiled display device TD. For another example, the side portion 23 may be integrally formed with an outer case covering the rear surface of the lower cover 20.

The second protrusion portion 24 of the lower cover 20 may protrude from the flat portion 21 in the opposite direction of the display panel 100. The second protrusion portion 24 may protrude from the flat portion 21 in the opposite direction of the display panel 100. The second protrusion portion 24 may protrude in the same direction as the first protrusion portion 22. The second protrusion portion 24 may extend from the other side of the flat portion 21 toward another adjacent display device 10. The second protrusion portion 24 may overlap a gap GAP between the plurality of display devices 10. The second protrusion portion 24 may overlap the flexible films 210 disposed between the plurality of display devices 10. For example, the second protrusion portion 24 may be spaced from the lower surface of the panel lower member 300 and may accommodate a device or other members connected to the source circuit board 230.

The lower cover 20 may include a metal material or a plastic material. For example, the lower cover 20 may include at least one of stainless steel, aluminum (Al), a magnesium (Mg) alloy, a magnesium (Mg)-lithium (Li) alloy, an aluminum (Al) alloy, and polycarbonate (PC), but the material thereof is not limited thereto.

The coupling member 500 may couple the plurality of display devices 10 and the lower cover 20. The coupling member 500 may include a first coupling member 510 and a second coupling member 520 that are coupled to each other.

The first coupling member 510 may be fixed to the support plate 400 and may protrude from the support plate 400 to pass through the alignment hole AH of the lower cover 20. The first coupling member 510 may be mutually coupled with the second coupling member 520 disposed on the lower surface 20s of the lower cover 20, thereby fixing and coupling the support plate 400 and the lower cover 20.

The first coupling member 510 may include a first base portion 511 and a first coupling portion 512. The first base portion 511 may be fixed by being inserted into the support plate 400. For example, one surface of the first base portion 511 of the first coupling member 510 may be provided to be flat with the upper surface of the support plate 400. For another example, one surface of the first base portion 511 of the first coupling member 510 may be inserted up to the inside of the support plate 400. The first base portion 511 of the first coupling member 510 may penetrate the support plate 400, and the first coupling portion 512 of the first coupling member 510 may protrude from the lower surface of the support plate 400.

The first coupling portion 512 may pass through the alignment hole AH to protrude up to the lower portion of the flat portion 21 and may be coupled with the second coupling portion 522 of the second coupling member 520. For example, the first coupling portion 512 and the second coupling portion 522 may include screws corresponding to each other. The first coupling portion 512 may be a male screw, and the second coupling portion 522 may be a female screw that is screwed to the first coupling portion 511, but the present invention is not limited thereto.

The diameter of the first coupling portion 512 may be smaller than the diameter of the alignment hole AH. The first coupling portion 512 may be surrounded by the alignment hole AH on the plane. Because the diameter of the first coupling portion 512 may be smaller than the diameter of the alignment hole AH, in the process of finely adjusting the positions of the plurality of display devices 10, the first coupling portion 512 may be finely moved within the alignment hole AH.

When the alignment of the plurality of display devices 10 is completed, the first coupling portion 512 may be coupled with the second coupling portion 522 of the second coupling member 520, and the plurality of display devices 10 may be fixed and coupled onto the lower cover 20.

The second coupling member 520 may be disposed on the lower surface 20s of the flat portion 21 of the lower cover 20 and may be coupled to the first coupling member 510 to fix the plurality of display devices 10 onto the lower cover 20. The second coupling member 520 may include a second base portion 521 and the second coupling portion 522. The second base portion 521 may be disposed under the flat portion 21 of the lower cover 20 and may support the second coupling portion 522.

The second coupling portion 522 may be coupled with the first coupling portion 512 until the second coupling portion 522 protrudes from the second base portion 521 and is in close contact with the lower surface 20s of the flat portion 21. For example, the height of the first coupling portion 512 may be equal to or less than the sum of the height of the alignment hole AH combined with the height of the second coupling portion 522. Accordingly, the second coupling portion 522 may be coupled with the first coupling portion 512 such that the upper surface of the second coupling portion 522 presses the lower surface 20s of the lower cover 20. For example, the first coupling portion 512 and the second coupling portion 522 may include screws corresponding to each other. The first coupling portion 512 may be a male screw, and the second coupling portion 522 may be a female screw that is screwed to the first coupling portion 511, but the present invention is not limited thereto.

The outer diameter of the second coupling portion 522 may be larger than the diameter of the alignment hole AH. The second coupling portion 522 may be coupled to the first coupling portion 512 having a diameter smaller than the diameter of the alignment hole AH to press the lower surface 20s of the flat portion 21. Accordingly, the support plate 400 into which the first coupling member 510 is inserted and the lower cover 20 pressed by the second coupling member 520 may be fixed and coupled.

Figure 10:
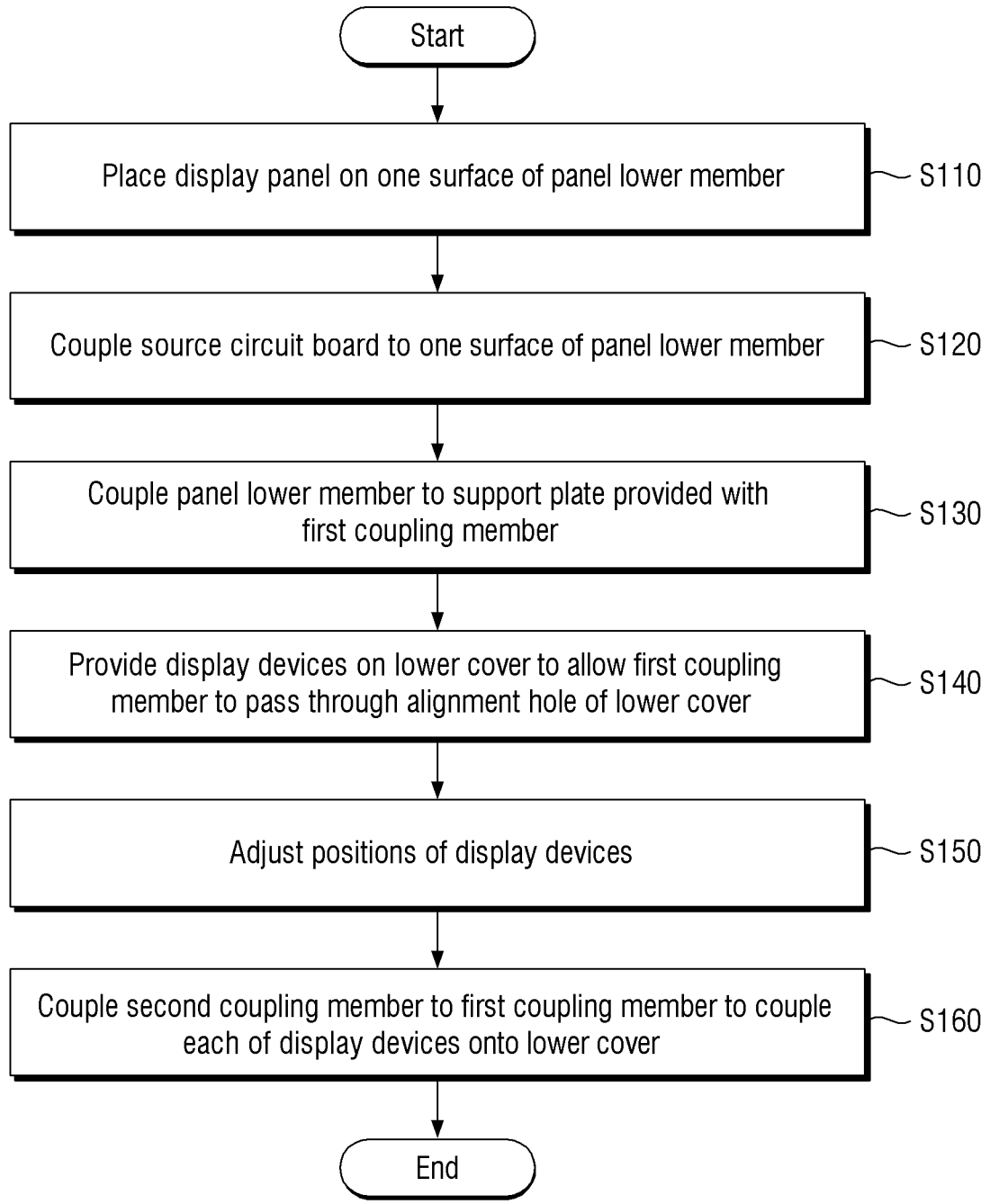
FIG. 10 is a flowchart illustrating a process of manufacturing a tiled display device according to an embodiment.

FIG. 10 is a flowchart illustrating a process of manufacturing a tiled display device according to an embodiment.

Referring to the process of FIG. 10, a tiled display device TD may include a plurality of display devices 10, a lower cover 20, and a coupling member 500 configured to couple the plurality of display devices 10 and the lower cover 20. Each of the plurality of display devices 10 may include a display panel 100, a panel lower member 300, a support plate 400, a plurality of source flexible films 210, a plurality of source drivers 220, and a source circuit board 230.

The display panel 100 may be disposed on the upper surface of the panel lower member 300 (operation S110). For example, the panel lower member 300 may include at least one of a heat dissipation layer configured to efficiently dissipate heat from the display panel 100, an electromagnetic wave blocking layer configured to block electromagnetic waves, a light blocking layer configured to block light incident from the outside, and a buffer layer configured to absorb an external impact.

The source circuit board 230 may be disposed on one surface of the panel lower member 300 (operation S120). The source circuit board 230 may be coupled to the lower surface of the panel lower member 300 through a second adhesive member 235. For example, the second adhesive member 235 may be a double-sided tape or adhesive film having excellent adhesion. The source circuit board 230 may be connected to a plurality of flexible films 210 extending from the side surface of the display panel 100 to the lower portion of the display panel 100. The source circuit board 230 may be disposed in an area where the support plate 400 is not disposed in the lower surface of the panel lower member 300.

The panel lower member 300 may be disposed on the upper surface of the support plate 400 on which the first coupling member 510 is provided (operation S130). The panel lower member 300 may be coupled to the upper surface of the support plate 400 through a first adhesive member 410. For example, the first adhesive member 410 may be a double-sided tape or adhesive film having excellent adhesion.

The plurality of display devices 10 may be mounted on the lower cover 20 such that the first coupling member 510 passes through an alignment hole AH of the lower cover 20 (operation S140).

After the plurality of display devices 10 are mounted on the lower cover 20, the plurality of display devices 10 may be aligned such that the side surfaces thereof are in close contact with each other (operation S150). Because the diameter of the alignment hole AH is larger than the diameter of the first coupling portion 512, in the process of finely adjusting the positions of the plurality of display devices 10, the first coupling portion 512 may be finely moved within the alignment hole AH. The difference in diameter between the alignment hole AH and the first coupling portion 512 may be designed such that the first coupling portion 512 may freely move within the alignment hole AH in the process of aligning the plurality of display devices 10.

When the alignment of the plurality of display devices 10 is completed, the second coupling portion 522 of the second coupling member 520 may be coupled with the first coupling portion 512, and the plurality of display devices 10 may be fixed and coupled onto the lower cover 20 (operation S160).

Accordingly, because the tiled display device TD includes the alignment hole AH larger than the diameter of the first coupling portion 512, the plurality of display devices 10 may be easily aligned without separate alignment equipment, and the assembly tolerances or coupling tolerances between the plurality of display devices 10 may be prevented. For example, because the tiled display device TD includes the first and second coupling members 510 and 520 and the alignment holes AH, the distance between the plurality of display devices 10 may be minimized by completely attaching the side surfaces of the plurality of display devices 10 to each other, and the tilt tolerances of the display panels 100 may be minimized. In the tiled display device TD, The scribing tolerances of the display panels 100 may be minimized, and the assembly tolerances occurring in the process of coupling the plurality of display devices 10 to the lower cover 20 may be minimized. As a result, the tiled display device TD may remove the disconnection feeling between the plurality of display devices 10 and improve the immersion of an image by preventing the boundary portion or the non-display area between the plurality of display devices from being visually recognized.

Figure 11:
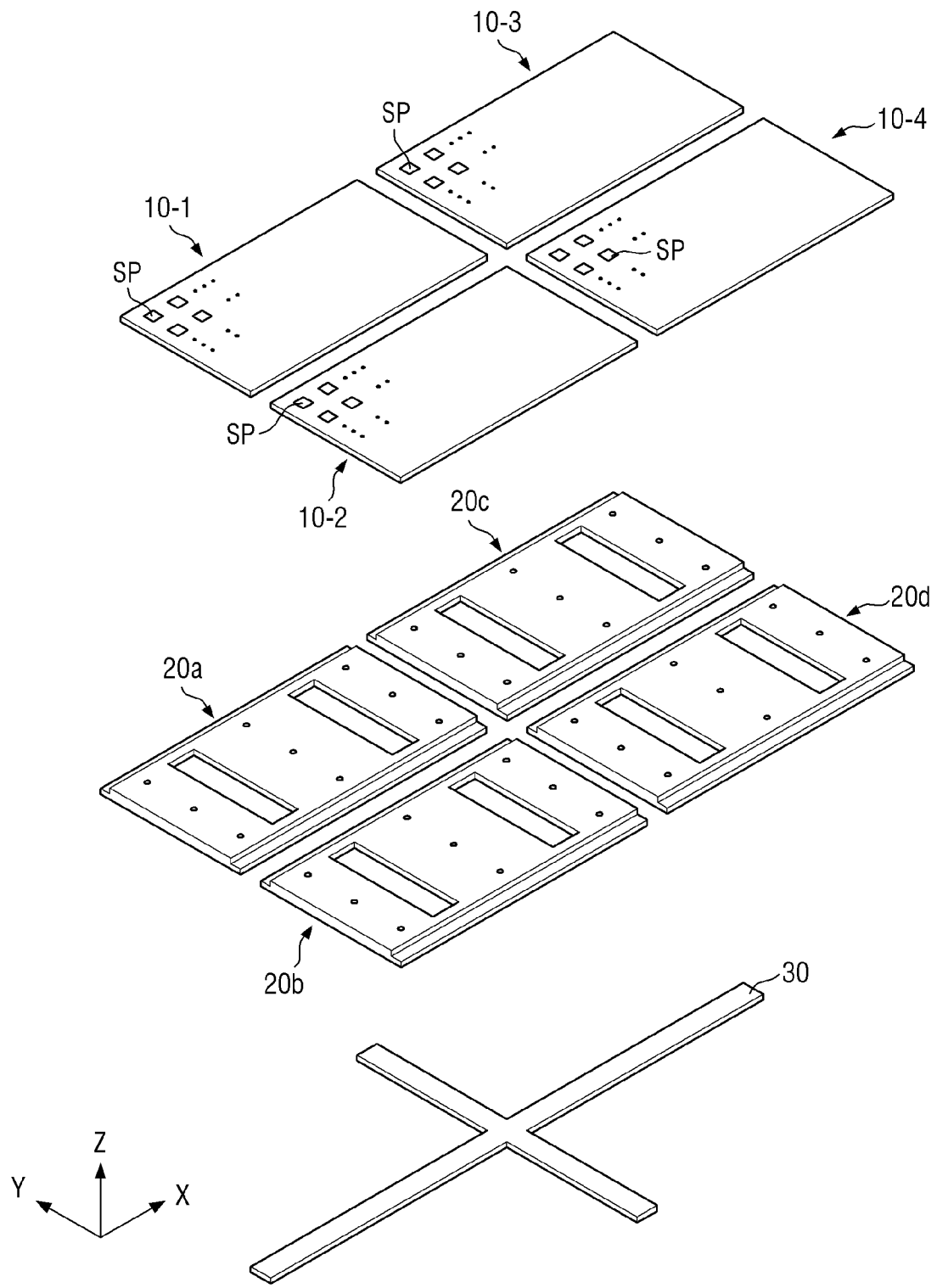
FIG. 11 is a plan view illustrating a structure of a tiled display device according to another embodiment.
Figure 12:
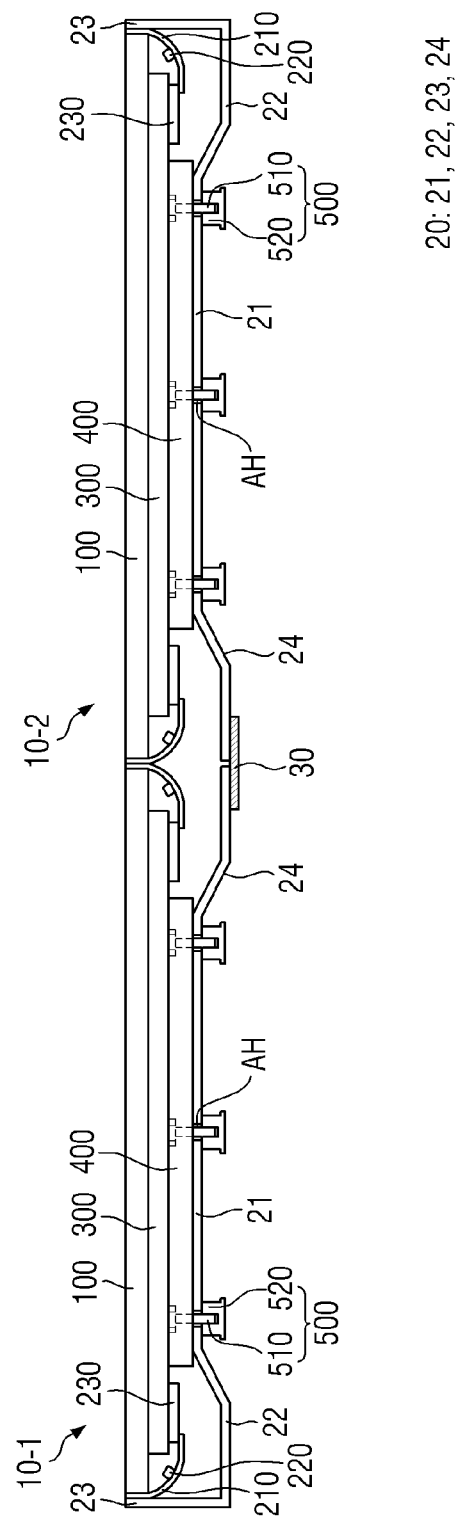
FIG. 12 is a cross-sectional view illustrating a tiled display device according to another embodiment.

FIG. 11 is a plan view illustrating a structure of a tiled display device according to another embodiment, and FIG. 12 is a cross-sectional view illustrating a tiled display device according to another embodiment. FIGS. 11 and 12 illustrate the tiled display device of FIGS. 4 and 6 further including an auxiliary plate 30. Therefore, components the same as those described above will be briefly described or omitted.

Referring to FIGS. 11 and 12, the tiled display device TD may include a plurality of display devices 10, a plurality of lower covers 20, and an auxiliary plate 30.

The tiled display device TD may include first to fourth display devices 10-1, 10-2, 10-3, and 10-4, but the number of display devices 10 is not limited to that of the embodiment of FIGS. 11 and 12. The number of display devices 10 may be determined according to the size of each of the display device 10 and the tiled display device TD.

The first to fourth display devices 10-1, 10-2, 10-3, and 10-4 may be arranged in a lattice shape, and side surfaces thereof contact each other to constitute one tiled display device TD. The first to fourth display devices 10-1, 10-2, 10-3, and 10-4 may be arranged adjacent to each other to display one integrated image. The display area DA of each of the first to fourth display devices 10-1, 10-2, 10-3, and 10-4 is a part of the tiled display device TD, and may display an image of the corresponding area in one image displayed from the tiled display device TD. The tiled display device TD may include the plurality of display devices 10 to increase the size of the tiled display device TD while displaying a high-quality image.

Each of the plurality of lower covers 20 may correspond to each of the plurality of display devices 10. For example, the plurality of lower covers 20 may include first to fourth lower covers 20a, 20b, 20c, and 20d. Each of the first to fourth lower covers 20a, 20b, 20c, and 20d may include a plurality of alignment holes AH, and may be coupled to the lower portion of the display panel 100 of each of the first to fourth display devices 10-1, 10-2, 10-3, and 10-4. The lower cover 20 may be disposed under the corresponding display device 10 to protect the lower surface of the display device 10. The lower cover 20 may be coupled to the corresponding display device by the first coupling members passing through the plurality of alignment holes AH and the second coupling members 520 coupled with the first coupling members 510.

The auxiliary plate 30 may be disposed on the rear surface between the plurality of lower covers 20 and may couple the adjacent lower covers 20. For example, the auxiliary plate 30 may be integrally formed, and may couple the first to fourth lower covers 20a, 20b, 20c, and 20d. The auxiliary plate 30 may have a lattice shape passing between the plurality of lower covers 20, but the shape thereof is not limited thereto. For another example, a plurality of auxiliary plates 30 may be formed, and may couple the lower covers 20 adjacent to each other among the plurality of lower covers 20.

For example, the auxiliary plate 30 may include at least one of stainless steel, aluminum (Al), a magnesium (Mg) alloy, a magnesium (Mg)-lithium (Li) alloy, an aluminum (Al) alloy, and polycarbonate (PC), but the material thereof is not limited thereto.

Accordingly, the tiled display device TD may include the plurality of display devices 10, the plurality of lower covers 20, and the auxiliary plate 30, thereby realizing a very large tiled display device TD while displaying a high-quality image.

According to tiled display devices of embodiments, because the tiled display device includes an alignment hole larger than the diameter of a first coupling portion, a plurality of display devices may be easily aligned without separate alignment equipment, and the assembly tolerances or coupling tolerances between the plurality of display devices may be prevented. Further, because the tiled display device includes first and second coupling members and alignment holes, the distance between the plurality of display devices may be minimized by completely attaching the side surfaces of the plurality of display devices to each other, and the tilt tolerances of the display panels may be minimized. As a result, the tiled display device may remove the disconnection feeling between the plurality of display devices and improve the immersion of an image by preventing the boundary portion or the non-display area between the plurality of display devices from being visually recognized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tiled display device, comprising:
a plurality of display devices each including a display panel including a plurality of pixels and a support plate disposed under the display panel;
a lower cover including an alignment hole and coupled to a lower portion of the support plate of each of the plurality of display devices; and
a first coupling member including a base portion fixed to the support plate and a first coupling portion protruding from the base portion and passing through the alignment hole,
wherein a diameter of the first coupling portion is smaller than a diameter of the alignment hole,
wherein each of the display devices further includes:
a connection pad on a side surface of the display panel; and
a flexible film disposed on one surface of the connection pad, and
wherein the lower cover includes:
a flat portion coupled to the support plate to support the support plate;
a first protrusion portion protruding from the flat portion in an opposite direction of the display panel and overlapping the flexible film disposed at an outermost side of the plurality of display devices;
a side portion bent from the first protrusion portion to surround outer surfaces of the plurality of display devices; and
a second protrusion portion protruding from the flat portion in the same direction as the first protrusion portion and overlapping the flexible film between the plurality of display devices.

2. The tiled display device of claim 1,
wherein the alignment hole surrounds the first coupling portion on a plane to be spaced apart from the first coupling portion.

3. The tiled display device of claim 1, further comprising:
a second coupling member disposed on a lower surface of the lower cover and coupled to the first coupling portion to fix the plurality of display devices onto the lower cover.

4. The tiled display device of claim 3,
wherein the alignment hole is surrounded by an outer surface of the first coupling portion, a lower surface of the support plate, an inner surface of the lower cover surrounding the alignment hole, and an upper surface of the second coupling portion.

5. The tiled display device of claim 3,
wherein the second coupling member includes:
a base portion disposed under the lower cover; and
a second coupling portion protruding from the base portion to be coupled with the first coupling portion and closely contacting the lower surface of the lower cover.

6. The tiled display device of claim 5,
wherein the first coupling portion is a male screw, and the second coupling portion is a female screw that is screwed to the first coupling portion.

7. The tiled display device of claim 5,
wherein a height of the first coupling portion is equal to or less than a sum of a height of the alignment hole and a height of the second coupling portion.

8. The tiled display device of claim 5,
wherein an outer diameter of the second coupling portion is larger than the diameter of the alignment hole.

9. The tiled display device of claim 1,
wherein each of the plurality of display devices further includes a panel lower member disposed between the display panel and the support plate.

10. The tiled display device of claim 9,
wherein the panel lower member includes at least one of a heat dissipation layer configured to dissipate heat from the display panel, an electromagnetic wave blocking layer configured to block electromagnetic waves, a light blocking layer configured to block light, and a buffer layer configured to absorb an impact.

11. The tiled display device of claim 1,
wherein each of the display devices further includes:
a source driver disposed on one surface of the flexible film; and
a source circuit board electrically connected to the flexible film and disposed under the display panel.

12. The tiled display device of claim 11,
wherein the support plate is disposed under a center of the display panel, and the source circuit board is disposed under an outer side of the display panel.

13. The tiled display device of claim 1,
wherein the display panel further includes a connection line electrically connected to the plurality of pixels and electrically connected to the flexible film through the connection pad.

14. A tiled display device, comprising:
a plurality of display devices each including a display panel including a plurality of pixels and a support plate disposed under the display panel;
a plurality of lower covers corresponding to each of the plurality of display devices, including alignment holes and coupled to a lower portion of the support plate of each of the plurality of display devices;
a first coupling member including a base portion fixed to the support plate and a first coupling portion protruding from the base portion and passing through the alignment hole; and
an auxiliary plate disposed on one surface of the plurality of lower covers to couple the plurality of lower covers,
wherein a diameter of the first coupling portion is smaller than a diameter of the alignment hole, wherein each of the lower covers includes:
a flat portion coupled to the support plate to support the support plate;
a first protrusion portion protruding from one side the flat portion in an opposite direction of the display panel; and
a second protrusion portion protruding from the other side of the flat portion in the opposite direction of the display panel, and
wherein each of the lower covers disposed at outermost sides of the plurality of lower covers further includes a side portion bent from the first protrusion portion to surround outer surfaces of the plurality of display devices.

15. The tiled display device of claim 14, further comprising:
a second coupling member disposed on a lower surface of the lower cover and coupled to the first coupling portion to fix each of the plurality of display devices onto each of the plurality of lower covers.

16. The tiled display device of claim 15,
wherein an outer diameter of the second coupling member is larger than the diameter of the alignment hole.

\* \* \* \* \*